United States Patent [19]
Tsuihiji et al.

[11] Patent Number: 6,032,723
[45] Date of Patent: Mar. 7, 2000

[54] AUTOMOTIVE AIR CONDITIONING DEVICE

[75] Inventors: Yoshinobu Tsuihiji; Mitsuru Endo; Yoshiaki Inaba, all of Tochigi, Japan

[73] Assignee: Calsonic Corporation, Tokyo, Japan

[21] Appl. No.: 09/320,213

[22] Filed: May 26, 1999

[30] Foreign Application Priority Data

Aug. 10, 1998 [JP] Japan ................................. 10-226252

[51] Int. Cl.[7] .............................. F25B 29/00; B60H 3/06; B60H 1/00
[52] U.S. Cl. .............................. 165/42; 165/43; 165/204; 454/121; 454/126; 454/156; 237/12.3 A
[58] Field of Search .............................. 165/42, 43, 204; 454/126, 121, 156; 237/12.3 A

[56] References Cited

U.S. PATENT DOCUMENTS

| | | | |
|---|---|---|---|
| 4,593,852 | 6/1986 | Tajima et al. | 454/121 |
| 4,730,662 | 3/1988 | Kobayashi | 165/204 |
| 4,791,981 | 12/1988 | Ito | 165/204 |
| 5,062,473 | 11/1991 | Ostraud et al. | 165/43 |
| 5,173,078 | 12/1992 | Robin et al. | 454/126 |
| 5,195,574 | 3/1993 | Tanaka et al. | 165/43 |
| 5,632,672 | 5/1997 | Higashihara | 454/126 |
| 5,701,949 | 12/1997 | Yamaguchi et al. | 165/43 |
| 5,884,689 | 3/1999 | Takechi et al. | 165/43 |
| 5,893,407 | 4/1999 | Okamoto et al. | 165/43 |
| 5,927,380 | 7/1999 | Scoccia | 165/43 |

FOREIGN PATENT DOCUMENTS 63-152708  10/1988  Japan .

*Primary Examiner*—J. Ford
*Attorney, Agent, or Firm*—Foley & Lardner

[57] ABSTRACT

Four air flow control doors of an automotive air conditioning device are synchronously controlled by a link mechanism. With a unique construction of the link mechanism, the following advantageous results are obtained. In a ventilation mode of a maximum cool condition, sufficient amount of cooled air can be blown into the vehicle cabin from a ventilation opening. In the ventilation mode of a half-hot condition, mixing of cooled air and warmed air is effectively carried out before being blown into the vehicle cabin. In a bi-level mode of the half-hot condition, the passengers in the vehicle cabin can enjoy a so-called "lower side warming and upper side cooling" air conditioning wherein the lower portion of the vehicle cabin is suitably warmed and the upper portion of the vehicle cabin is suitably cooled.

10 Claims, 7 Drawing Sheets

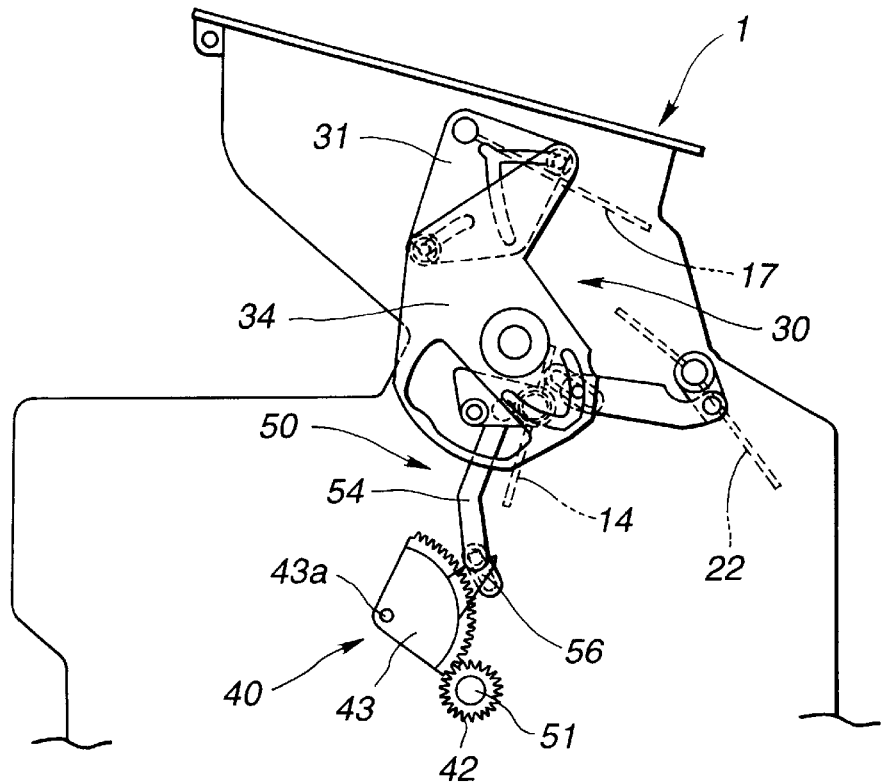
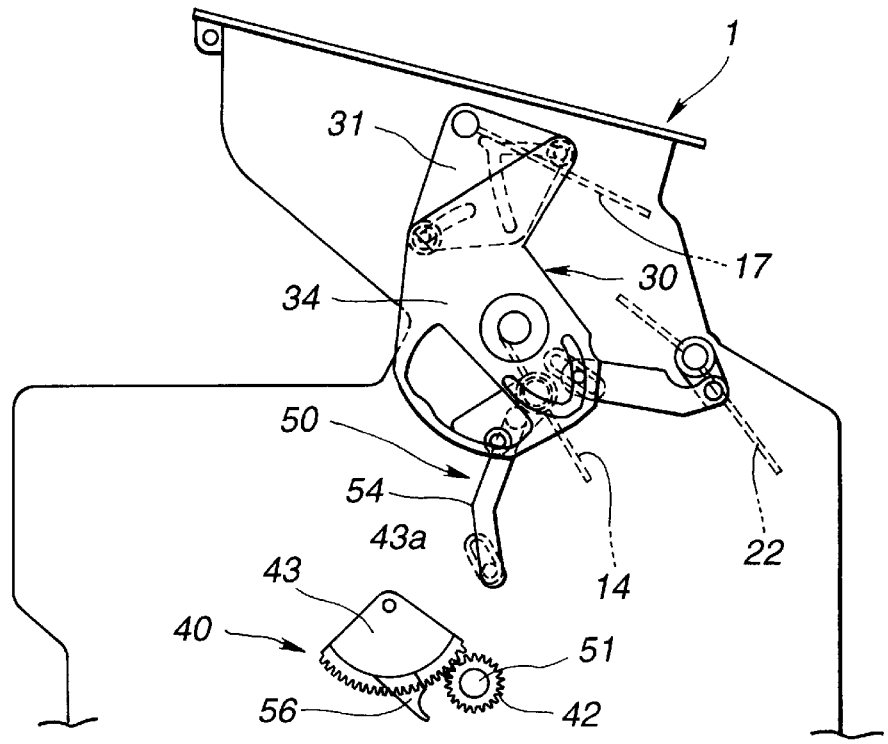

AUTOMOTIVE AIR CONDITIONING DEVICE

BACKGROUND OF THE INVENTION

1. Field of the Invention

The present invention relates in general to automotive air conditioning devices, and more particularly to the automotive air conditioning devices of a type which has a plurality of doors (or dampers) for providing a plurality of air conditioning modes.

2. Description of the Prior Art

In order to clarify the task of the present invention, some conventional automotive air conditioning devices will be briefly described.

One of them is shown in Laid-open Japanese Utility Model Application (Jikkai) 63-152708. The device of the publication has an air mix door and a temperature difference compensating door. That is, the known device comprises a case having an air flow passage including an upstream part and first and second downstream parts which are branched from the upstream parts. The first and second downstream parts extend to an air mix chamber. An evaporator is installed in the upstream part of the air flow passage to cool air passing therethrough and a heater core is installed in the first downstream part of the air flow passage to heat air passing therethrough. A bypass passage extends from a part of the second downstream part to a downstream portion of the air mix chamber. An air mix door is pivotally installed in the air flow passage at the entrance portions of the first and second downstream parts and a temperature difference compensating door is installed in the bypass passage. The air mix door is pivotal between a hot air flowing position where the door opens the first downstream part while closing the second downstream part and a cool air flowing position where the door opens the second downstream part while closing the first downstream part of the air flow passage. The temperature difference compensating door selectively closes and opens the bypass passage. The bypass passage is provided at a position downstream of the temperature difference compensating door with both a ventilation opening and a defroster opening. These openings are provided with respective open/close doors (viz., ventilation door and defroster door). A foot opening is exposed to the air mix chamber, which is provided with an open/close door (viz., foot door). The ventilation opening is used for letting out the conditioned air toward a major or center part of the vehicle cabin, and the defroster opening is used for letting out the conditioned air toward å windshield of the vehicle. The foot opening is used for letting out the conditioned air toward a lower portion of the vehicle cabin.

Based on the parts-arrangement of the above-mentioned conventional air conditioning device, the following two air conditioning devices "A" and "B" have been hitherto proposed, one "A" being a device which has the temperature difference compensating door linked to the air mix door, and the other "B" being a device which has the temperature difference compensating door linked to the ventilation door, the defroster door and the foot door.

The following tables "Table-1" and "Table-2" show various conditions (or positions) of the temperature difference compensating doors employed in the above-mentioned devices "A" and "B" respectively.

TABLE 1

| | VENT | B/L | HEAT | H/D | Device-A DEF |
|---|---|---|---|---|---|
| M/COOL | O | O | O | O | O |
| ½ HOT | C | C | C | C | C |
| M/HOT | 20° 0 | 20° O | 20° O | 20° O | 20° O |

TABLE 2

| | VENT | B/L | HEAT | H/D | Device-B DEF |
|---|---|---|---|---|---|
| M/COOL | O | 5° O | C | C | 20° O |
| ½ HOT | O | 5° O | C | C | 20° O |
| M/HOT | O | 5° O | C | C | 20° O |

In the tables, "VENT", "B/L", "HEAT", "H/D" and "DEF" represent ventilation, bi-level, heat, heat/defrost and defrost modes respectively. "M/COOL" represents a maximum cool condition provided when the air mix door opens the second downstream part of the air flow passage while closing the first downstream part of the air flow passage. "½ HOT" represents a half-hot condition provided when the air mix door halfly or partially opens both the first and second downstream parts of the air flow passage. "M/HOT" represents a maximum hot condition provided when the air mix door opens the first downstream part of the air flow passage while closing the second downstream part of the air flow passage. "O" represents a condition wherein the temperature difference compensating door fully opens the bypass passage, "C" represents a condition wherein the temperature difference compensating door fully closes the bypass passage and "5° O" or "20° " represents a condition wherein the temperature difference compensating door partially opens the bypass passage, that is, by an angle of about 5 degrees or 20 degrees.

As is seen from Table-1, in the device "A", in the half-hot condition "½ HOT", the temperature difference compensating door assumes its close position (viz., closes the bypass passage) irrespective of the mode taken by the device. Thus, in each mode of the half-hot condition, the warmed air passing through the first downstream part of the air flow passage and the cooled air passing through the second downstream part of the air flow passage are mixed in the air mix chamber. This means that, in the ventilation mode of the half-hot condition "½ HOT", temperature-controlled air can be led into the vehicle cabin from the ventilation opening. However, due to its inherent construction, in the bi-level mode of the half-hot condition "½ HOT", it has been difficult to provide an appropriate temperature difference between the temperature-controlled air blown from the ventilation opening and the temperature-controlled air blown from the foot opening. That is, in such mode, a desirable air conditioning wherein the passenger's heads are suitably cooled and the passenger's feet are suitably warmed is not obtained.

As is seen from Table-2, in the device "B", in the ventilation mode "VENT", the temperature difference compensating door takes its open position (viz., opens the bypass passage) throughout the "M/COOL", "½ HOT" and "M/HOT" conditions. That is, the temperature difference compensating door takes the open position irrespective of the position of the air mix door. This means that, in the ventilation mode of the maximum cool condition "M/COOL", the air flow resistance exhibited by the temperature difference compensating door is low and thus satisfied amount of air is blown into the vehicle cabin from the ventilation opening. Thus, in hot season like summer, a larger amount of cooled air can be led into the vehicle cabin from the ventilation opening, which makes the passengers comfortable. However, due to its inherent construction, in the ventilation mode of the half-hot condition "½ HOT", mixing of cooled air and warmed air is not effectively carried out before being blown into the vehicle cabin. This is because part of the cooled air passing through the second downstream part of the air flow passage bypasses the air mix chamber.

SUMMARY OF THE INVENTION

It is therefore an object of the present invention to provide an automotive air conditioning device which is free of the above-mentioned drawbacks.

According to the present invention, there is provided an automotive air conditioning device which satisfies the followings. That is, in a ventilation mode of a maximum cool condition, sufficient amount of cooled air can be blown into the vehicle cabin from a ventilation opening, in the ventilation mode of a half-hot condition, mixing of cooled air and warmed air is effectively carried out before being blown into the vehicle cabin and in a bi-level mode of the half-hot condition, the passengers in the vehicle cabin can enjoy a so-called "lower part warming and upper part cooling" air conditioning wherein the lower portion of the vehicle cabin is suitably warmed and the upper portion of the vehicle cabin is suitably cooled.

According the present invention, there is provided an automotive air conditioning device which comprises an air flow passage including an upstream part and first and second downstream parts each extending downstream from a downstream end of the upstream part; an evaporator installed in the upstream part to cool air flowing therethrough; a heater core installed in the first downstream part to heat air flowing therethrough; a slide type air mix door which slides between a first slide position where the door closes the first downstream part while opening the second downstream part and a second slide position where the door opens the first downstream part while closing the second downstream part; an air mix chamber with which downstream portions of the first and second downstream parts are merged; a partition wall extending in and along the air mix chamber to define at a downstream portion of the air mix chamber a bypass passage and an air mix passage, the bypass passage having an upstream portion facing the second downstream part, the air mix passage having an upstream portion facing both the first and second downstream parts; a temperature difference compensating door pivotally installed in the bypass passage to open and close the same; ventilation and defroster openings each facing downstream portions of the bypass passage and the air mix passage; a pivotal switch door which pivots between a first angular position where the door closes the defroster opening while opening the ventilation opening and a second angular position where the door opens the defroster opening while closing the ventilation opening; a foot opening facing the air mix passage; a pivotal foot door for opening and closing the foot opening; and a link mechanism for synchronously actuating the air mix door, the temperature difference compensating door, the switch door and the foot door, wherein the link mechanism is so constructed that when the air mix door assumes the first slide position, the temperature difference compensating door fully opens the bypass passage irrespective of the mode taken by the air conditioning device, and when the air mix door takes an intermediate position to partially open both the first and second downstream parts or takes the second slide position, the temperature difference compensating door takes one of predetermined three angular positions in accordance with the mode taken by the air conditioning device.

BRIEF DESCRIPTION OF THE DRAWINGS

Other objects and advantages of the present invention will become apparent from the following description when taken in conjunction with the accompanying drawings, in which:

FIG. 6A is a view similar to FIG. 2, but showing a condition wherein the air conditioning device is in a heat/defrost mode of a maximum cool condition;

FIG. 6B is a view similar to FIG. 2, but showing a condition wherein the air conditioning device is in a heat/defrost mode of a maximum hot condition;

DETAILED DESCRIPTION OF THE INVENTION

Figure 1:
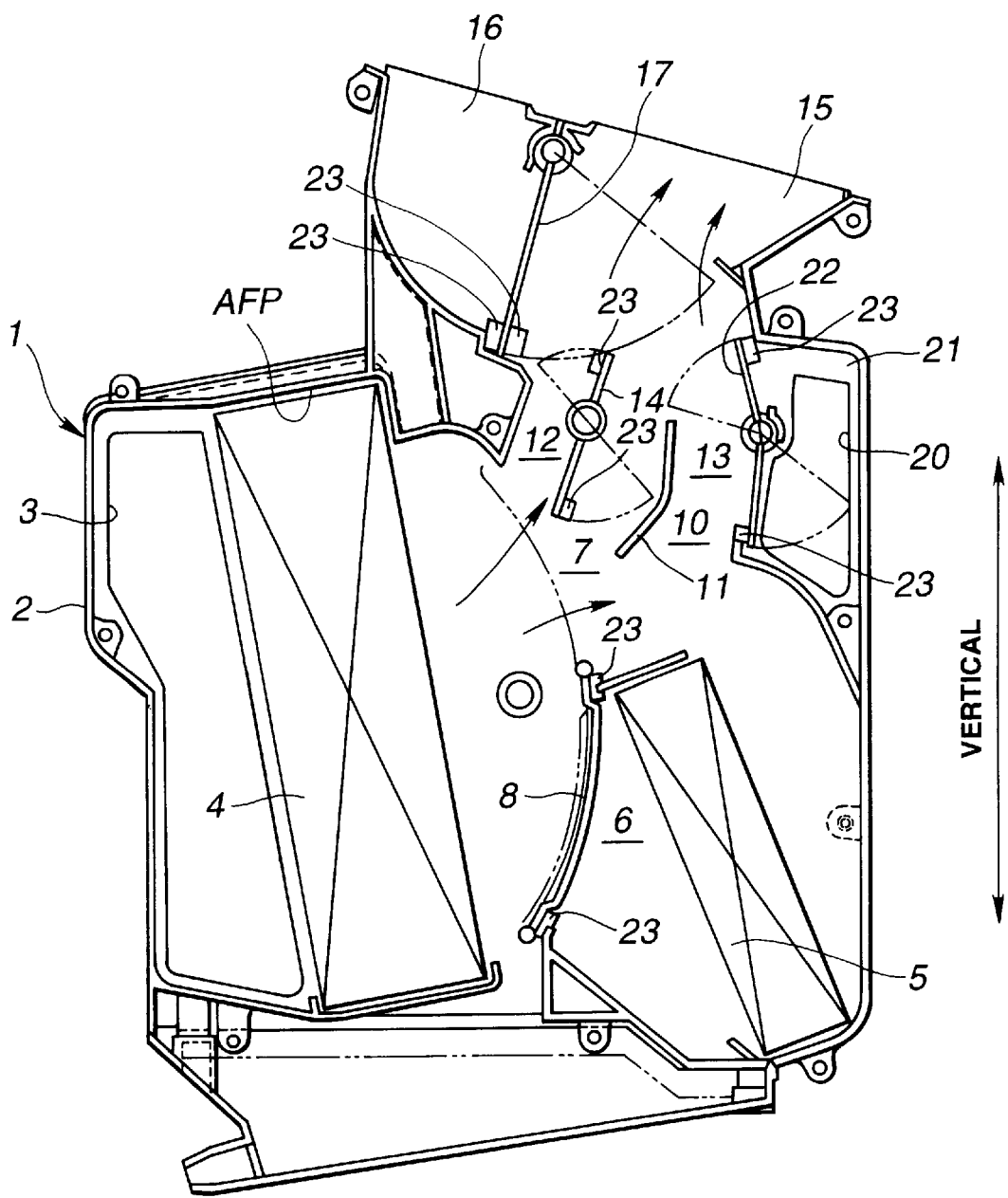
FIG. 1 is a sectional view of an automotive air conditioning device of the present invention.

Referring to FIG. 1 of the drawings, there is shown an automotive air conditioning device of the present invention, which is generally designated by numeral 1.

As shown, the air conditioning device 1 comprises a case 2 having an inlet opening 3 to which an outlet opening of a blower unit (not shown) is connected. That is, air driven by the blower unit is led through the inlet opening 3 into an air flow passage "AFP" defined in the case 2.

The air flow passage "AFP" comprises an upstream part, first and second downstream parts 6 and 7 each extending downstream from the upstream part and an air mix chamber 10 to which the first and second downstream parts are led.

An evaporator 4 is installed in the upstream part of the air flow passage "AFP" to cool air passing therethrough. In the first downstream part 6, there is installed a heater core 5 to heat air passing therethrough.

Between the upstream part of the air flow passage "AFP" and each of the first and second downstream parts 6 and 7 of the same, there is slidably installed a slide-type air mix door 8 which can slide between a cool air flowing position where, as shown by a solid line in the drawing, the door 8 opens the second downstream part 7 while closing the first downstream part 6 and a hot air flowing position where, as is shown by a phantom line, the door 8 opens the first downstream part 6 while closing the second downstream part 7.

As shown, the door 8 has an arcuate cross section and is arranged in the passage "AFP" with its convex surface facing in a downstream direction. With this arrangement, when the door 8 takes the cool air flowing position as shown in FIG. 1, the cooled air from the evaporator 4 is smoothly guided toward the second downstream part 7, while when the door 8 takes the hot air flowing position as shown by a phantom line in the drawing, the cooled air from the evaporator 4 is smoothly guided toward the first downstream part 6.

Although not shown in FIG. 1, for moving the door 8 along a given path, there is employed a drive mechanism which includes a rack and a pinion.

In the air mix chamber 10, warmed air flow from the first downstream part 6 and cooled air flow from the second downstream part 7 are mixed to produce a temperature-controlled air flow. In the air mix chamber 10, there is arranged a partition wall 11 which extends along an air flow in the second downstream part 7.

Between the partition wall 11 and an upper wall of the case 2, there is defined a bypass passage 12 which extends to a downstream portion of the air mix chamber 10. That is, part of air flowing in the second downstream part 7 is led to a terminal end portion of the air flow passage "AFP" bypassing a major portion of the air mix chamber 10.

Behind the partition wall 11, there is defined an air mix passage 13 which extends from the air mix chamber 10 to the terminal end portion of the air flow passage "AFP".

In the bypass passage 12, there is pivotally installed a temperature difference compensating door 14 which can open and close the bypass passage 12.

Ventilation and defroster openings 15 and 16 are formed in the upper wall of the case 2, which are exposed to the terminal end portion of the air flow passage "AFP". As shown, these two openings 15 and 16 are positioned near to each other.

The two openings 15 and 16 are provided at their entrance portions with a common switch door 17, which is pivotal between a first position where the door 17 opens the ventilation opening 15 while closing the defroster opening 16 and a second position where the door 17 opens the defroster opening 16 while closing the ventilation opening 15. It is thus to be noted that the switch 17 serves as two doors, one being a ventilation door for the ventilation opening 15 and the other being a defroster door for the defroster opening 16.

Near the air mix passage 13, there is defined a foot passage 21 through which the temperature-controlled air flowing in the air mix passage 13 is led to a foot opening 20. In an upstream part of the foot passage 21, there is pivotally installed a foot door 22 which can pivot between a first position wherein as shown in the drawing, the door 22 closes the foot passage 21 while opening the air mix passage 13 and a second position wherein as shown by a phantom line the door 22 opens the foot passage 21 while closing the air mix passage 13.

Denoted by numerals 23 are seal members which applied to the air mix door 8, the temperature difference compensating door 14, the switch door 17 and the foot door 22 for assuring a sealing when the doors assume their terminal positions.

Figure 2:
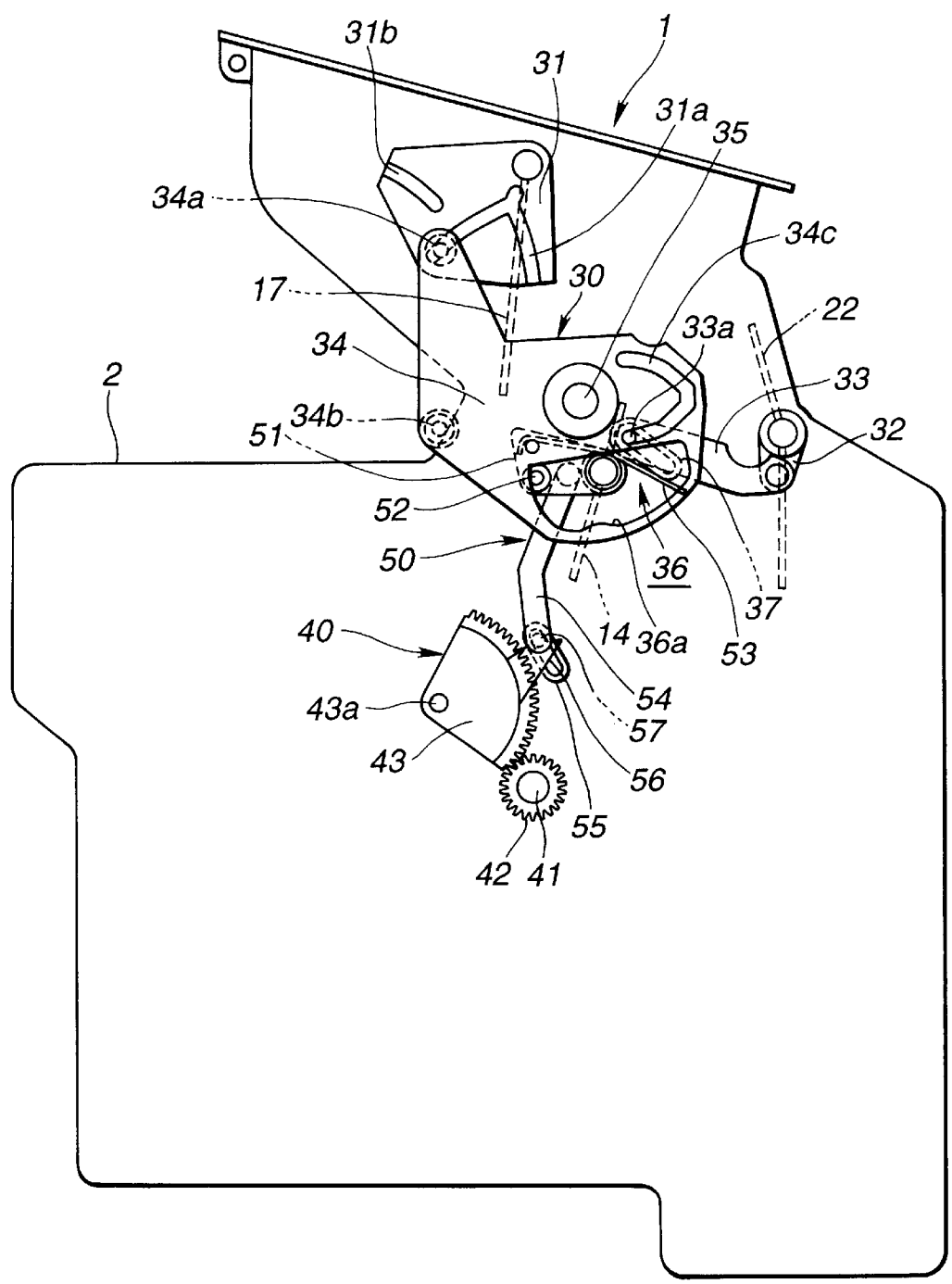
FIG. 2 is a schematic view of a link mechanism used in the air conditioning device of the present invention, showing a condition wherein the air conditioning device is in a ventilation mode of a maximum cool condition.

Referring to FIG. 2, there is shown a link mechanism for driving the above-mentioned various doors.

The link mechanism comprises a first link mechanism section 30 which controls the switch door 17 and the foot door 22, a second link mechanism section 40 which controls the air mix door 8 and a third link mechanism section 50 which controls the temperature difference compensating door 14 in response to the movements of the first and second link mechanism sections 30 and 40.

The first link mechanism section 30 comprises a switch door pivoting lever 31 which is integrally pivotal with the switch door 17, a foot door pivoting lever 32 which is integrally pivotal with the foot door 22 and a main lever 34 which is detachably engageable with the switch door pivoting lever 31 and operatively connected through a connecting lever 33 to the foot door pivoting lever 32.

As is seen from FIG. 2, the main lever 34 has a center portion fixed to a main lever pivoting shaft 35 which is pivotally supported by the case 2. One end of the main lever 34 has a first engaging pin 34*a* which is slidably engaged with a first engaging groove 31*a* formed in the switch door pivoting lever 31. As will become apparent as the description proceeds, in a certain condition, the first engaging pin 34*a* is detachable from the first engaging groove 31*a*. Another end of the main lever 34 has a second engaging pin 34*b* which is detachably engageable with a second engaging groove 31*b* formed in the switch door pivoting lever 31. An opposite portion of the main lever 24 with respect to the pivoting shaft 35 is formed with both an engaging slot 34*c* and a cam opening 36. A pin 33*a* provided by the connecting lever 33 is engageable with the engaging slot 34*c*.

The connecting lever 33 has one end pivotally connected to the foot door pivoting lever 32 and the other end having the pin 33*a* fixed thereto. The pin 33*a* slidably engaged with the engaging slot 34*c* is slidably engaged with an elongate slot formed in a guide member 37 provided on the case 2. Thus, the movement of the other end of the connecting lever 33 is guided by the guide member 37.

As will be described in detail hereinafter, when the main lever 34 is pivoted about an axis of the pivot shaft 35, the engaging slot 34*c* of the main lever 34 restricts the movement of the other end of the connecting lever 33 in cooperation with the elongate slot of the guide member 37, so that the foot door 22 is pivoted in a predetermined manner in response to the pivoting movement of the main lever 34. That is, the pivoting movement of the main lever 34 is transmitted through the connecting lever 33 and the foot door pivoting lever 32 to the foot door 22 to induce such a predetermined pivoting movement of the same.

The engaging slot 34*c* of the main lever 24 is so shaped as to satisfy the following conditions. That is, when the air conditioning device 1 assumes a ventilation mode or defroster mode, the foot door 22 closes the foot passage 21 while opening the air mix passage 13, and when the air conditioning device 1 assumes a bi-level mode or heat/defrost mode, the foot door 22 partially opens both the foot passage 21 and the air mix passage 13, and when the air conditioning device 1 assumes a heat mode, the foot door 22 opens the foot passage 21 while closing the air mix passage 13.

When the main lever 34 is pivoted about the axis of the pivot shaft 35, the first engaging pin 34*a* of the main lever 34 is engaged with the first engaging groove 31*a* of the of the switch door pivoting lever 31 thereby to pivot the switch door pivoting lever 31 and thus pivot the switch door 17, or the second engaging pin 34b of the main lever 34 is engaged with the second engaging groove 31b of the switch door pivoting lever 31 thereby to pivot the switch door 17 keeping the switch door pivoting lever 31 at a predetermined position.

The first engaging groove 31a of the switch door pivoting lever 31 is so shaped as to satisfy the following conditions. That is, when the air conditioning device 1 assumes the ventilation mode, the bi-level mode, the heat mode or heat/defrost mode, the first engaging groove 31a of the switch door pivoting lever 31 is engaged with the first engaging pin 34a of the main lever 34. When the air conditioning device 1 assumes the ventilation mode or the bi-level mode, the switch door 17 closes the defroster opening 16 while opening the ventilation opening 15. While, when the air conditioning device 1 assumes the heat mode or the heat/defrost mode, the switch door 17 opens the defroster opening 16 while closing the ventilation opening 15. When the air conditioning device 1 assumes the defrost mode, the first engaging groove 31a of the switch door pivoting lever 31 is disengaged from the first engaging pin 34a of the main lever 34.

The second engaging groove 31b of the switch door pivoting lever 31 is so shaped as to satisfy the following conditions. That is, when the air conditioning device 1 assumes the heat/defrost mode or the defrost mode, the second engaging groove 31b of the of the switch door pivoting lever 31 is so engaged with the second engaging pin 34b of the main lever 34 that the switch door 17 opens the defroster opening 16 while closing the ventilation opening 15. While when the air conditioning device 1 assumes the ventilation mode, the bi-level mode or the heat mode, the second engaging groove 31b is disengaged from the second engaging pin 34b.

The second link mechanism section 40 comprises an arcuate rack (not shown) provided on the slide-type air mix door 8, a pinion (not shown) meshed with the arcuate rack, a pinion driving shaft 41 having the pinion coaxially secured thereto, a driving gear 42 tightly disposed on the driving shaft 41, and a sector gear 43 meshed with the driving gear 42. That is, when the sector gear 43 is pivoted about its axis 43a, the slide-type air mix door 8 slides between the above-mentioned cool and hot air flowing positions. More specifically, in the illustrated embodiment, when the sector gear 43 is pivoted upward, the air mix door 8 slides downward, that is, toward the cool air flowing position, while, when the sector gear 43 is pivoted downward, the air mix door 8 slides upward, that is, toward the hot air flowing position.

The third link mechanism section 50 comprises a pivoting lever 51 which is integrally pivotal with the temperature difference compensating door 14, a cam pin 52 which is fixed to the pivoting lever 51, a spring 53 which biases the cam pin 52 to contact with a cam surface 36a defined by the cam opening 36 of the main lever 34, a control lever 54 which has one end pivotally connected to the pivoting lever 51, a movement restricting member 55 which restricts a movement of the other end of the control lever 54, and an engaging member 56 which is provided to the sector gear 43 and detachably engageable with the other end of the control lever 54.

The movement restricting member 55 is fixed to the case 2 and formed with an elongate slot with which a pin 57 provided by the other end of the control lever 54 is slidably engaged. That is, the movement of the other end of the control lever 54 is restricted to the length of the elongate slot of the movement restricting member 55.

The engaging member 56 is fixed to a given portion of the sector gear 43 and has an upper edge engageable with the other end of the control lever 54. More specifically, when the sector gear 43 is pivoted upward, the engaging member 56 is brought into contact with the other end of the control lever 54 to push the same upward. When the sector gear 43 is pivoted to its uppermost position, the engaging member 56 lifts up the control lever 54 to its uppermost position against the force of the spring 53. While, when the sector gear 43 is pivoted down from its uppermost position, the engaging member 56 becomes disengaged from the other end of the control lever 54.

When shifted up by the engaging member 56, the control lever 54 pivots the pivoting lever 51 upward against the force of the spring 53. With this upward pivoting of the pivoting lever 51, the temperature difference compensating door 14 is pivoted to a position to open the bypass passage 12.

It is to be noted that, in the illustrated embodiment 1, when the sector gear 43 assumes its uppermost position, the air mix door 8 takes the above-mentioned cool air flowing position where, as is seen from FIG. 1, the door 8 opens the second downstream part 7 while closing the first downstream part 6.

Accordingly, when the air mix door 8 assumes the cool air flowing position, the engagement between the control lever 54 and the engaging member 56 causes the temperature difference compensating door 14 to open the bypass passage 12 as shown in FIG. 1.

When the air mix door 8 takes a position other than the above-mentioned cool air flowing position, the engagement between the control lever 54 and the engaging member 56 is cancelled and due to force of the spring 53, the cam pin 52 of the pivoting lever 51 is pressed against the cam surface 36a of the cam opening 36 of the main lever 34. Under this condition, the pivoting movement of the pivoting lever 51 and thus that of the temperature difference compensating door 14 induced by the pivoting of the main lever 34 is so made as to depend on the shape of the cam surface 36a of the cam opening 36 of the main lever 34.

The cam surface 36a is so shaped as to satisfy the following conditions. That is, when the air mix door 8 assumes a position other than the cool air flowing position, the temperature difference compensating door 14 takes a position to fully close the bypass passage 12 in the ventilation mode, the heat mode or heat/defrost mode, takes a position to partially open the bypass passage 12 by an angle of about 5 degrees in the bi-level mode and takes a position to partially open the bypass passage 12 by an angle of about 20 degrees in the defrost mode.

It is to be noted that when the air mix door 8 is at the cool air flowing position, the cam pin 52 of the pivoting lever 51 is moved up in the cam opening 36 of the main lever 34 by the control lever 54 in response to the change of the mode from the ventilation mode to the defroster mode through the bi-level mode, the heat mode and the heat/defrost mode.

The following table "Table-3" shows various conditions of the temperature difference compensating door 14 operation modes provided by the air conditioning device 1 of the present invention.

TABLE 3

|  | VENT | B/L | HEAT | H/D | Device 1 DEF |
|---|---|---|---|---|---|
| M/COOL | O | O | O | O | O |
| ½ HOT | C | 5° O | C | C | 20° O |
| M/HOT | C | 5° O | C | C | 20° O |

In the following, operation of the air conditioning device 1 of the present invention will be described with the aid of the Table-3.

For ease of understanding, the description will be commenced with respect to a condition as shown in FIG. 2. That is, in this condition, the air conditioning device 1 assumes the ventilation mode "VENT" of the maximum cool condition "M/COOL" wherein the air mix door 8 closes the first downstream part 6 of the air flow passage "AFP" while opening the second downstream part 7 of the passage "AFP". In this condition, the control lever 54 is lifted up by the engaging member 56, so that the pivoting lever 51 is pivoted upward causing the temperature difference compensating door 14 to fully open the bypass passage 12. The switch door 17 takes a position to close the defroster opening 16 and open the ventilation opening 15 and the foot door 22 takes a position to close the foot passage 21 and open the air mix passage 13.

Accordingly, in the above-mentioned ventilation mode "VENT" of the maximum cool condition "M/COOL", the cooled air directed to the second downstream part 7 of the air flow passage "AFP" is allowed to flow in both the air mix passage 13 and the bypass passage 12 at the same time and blown into the vehicle cabin from the ventilation opening 15. Under this condition, the temperature difference compensating door 14 shows the minimum air flow resistance, so that sufficient amount of cooled air can be blown into the vehicle cabin from the ventilation opening 15. Thus, rapid cooling of the vehicle cabin is achieved.

Figure 3:
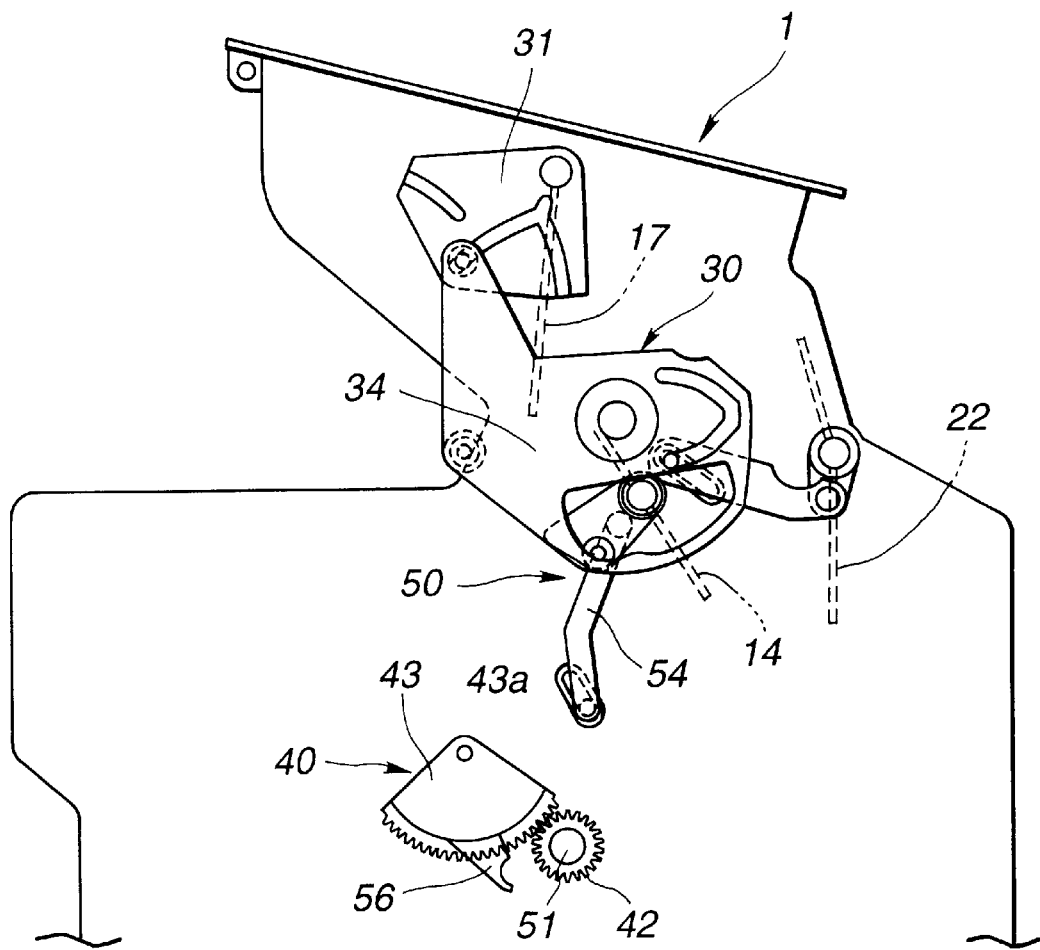
FIG. 3 is a view similar to FIG. 2, but showing a condition wherein the air conditioning device is in a ventilation mode of a maximum hot condition.

FIG. 3 shows a condition of the link mechanism wherein the air conditioning device 1 assumes the ventilation mode "VENT" of the maximum hot condition "M/HOT" wherein the air mix door 8 opens the first downstream part 6 of the air flow passage "AFP" while closing the second downstream part 7 of the passage "AFP". In this condition, the engagement between the control lever 54 and the engaging member 56 is cancelled, so that the temperature difference compensating door 14 closes the bypass passage 12. The switch door 17 takes a position to close the defroster opening 16 and open the ventilation opening 15, and the foot door 22 takes a position to close the foot passage 21 and open the air mix passage 13.

Accordingly, in the ventilation mode "VENT" of the maximum hot condition "M/HOT", the warmed air passing through the first downstream part 6 of the air flow passage "AFP" is allowed to flow in the air mix passage 13 and blown into the vehicle cabin from the ventilation opening 15.

If, under this condition, for pivoting the air mix door 8 to the intermediate position to partially open both the first and second downstream parts 6 and 7 of the air flow passage "AFP", the sector gear 43 is pivoted upward by an angle of about 45 degrees from the position as shown in FIG. 3, the switch door 17, the foot door 22 and the temperature difference compensating door 14 are not moved.

Accordingly, in the ventilation mode "VENT" of the half-hot condition "½ HOT" wherein the air mix door 8 halfly opens both the first and second downstream parts 6 and 7 of the air flow passage "AFP", the switch door 17 closes the defroster opening 16 and opens the ventilation opening 15, the foot door 22 closes the foot passage 21 and opens the air mix passage 13 and the temperature difference compensating door 14 closes the bypass passage 12. Accordingly, under this condition, the cooled air passing through the second downstream part 7 and the warmed air passing through the first downstream part 6 are mixed in the air mix chamber 10 and the air mix passage 13 to provide a temperature-controlled air flow which is blown into the vehicle cabin through the ventilation opening 15.

Figure 4A:
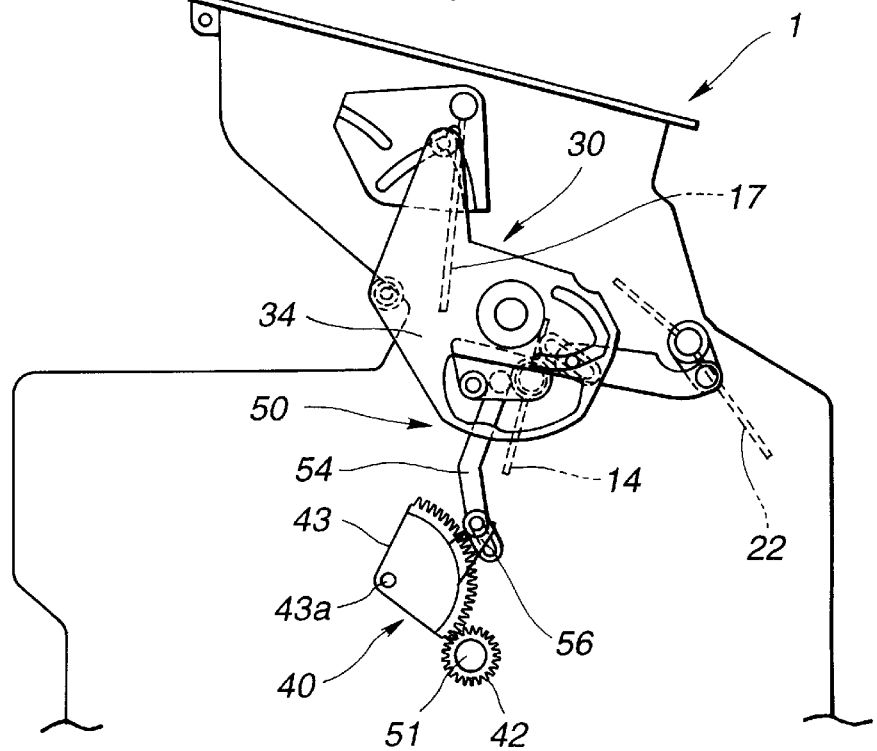
FIG. 4A is a view similar to FIG. 2, but showing a condition wherein the air conditioning device is in a bi-level mode of a maximum cool condition.

FIG. 4A shows a condition of the link mechanism wherein the air conditioning device 1 assumes the bi-level mode "B/L" of the maximum cool condition "M/COOL" wherein the air mix door 8 closes the first downstream part 6 of the air flow passage "AFP" while opening the second downstream part 7 of the passage "AFP". In this condition, the control lever 54 and the engaging member 56 are so engaged that the temperature difference compensating door 14 fully opens the bypass passage 12. The switch door 17 takes a position to close the defroster opening 16 and open the ventilation opening 15, and the foot door 22 partially opens both the foot passage 21 and the air mix passage 13.

Accordingly, in the bi-level mode "B/L" of the maximum cool condition "M/COOL", the cooled air directed to the second downstream part 7 is allowed to flow in both the bypass passage 12 and the air mix passage 13 at the same time and blown into the vehicle cabin from the ventilation opening 15. At the same time, part of the cooled air flowing in the air mix passage 13 is blown into a lower portion of the vehicle cabin through the foot opening 20. Under this condition, the temperature difference compensating door 14 shows the minimum air flow resistance, and thus, sufficient amount of cooled air can be led into the vehicle cabin through the ventilation opening 15 and the foot opening 20.

Figure 4B:
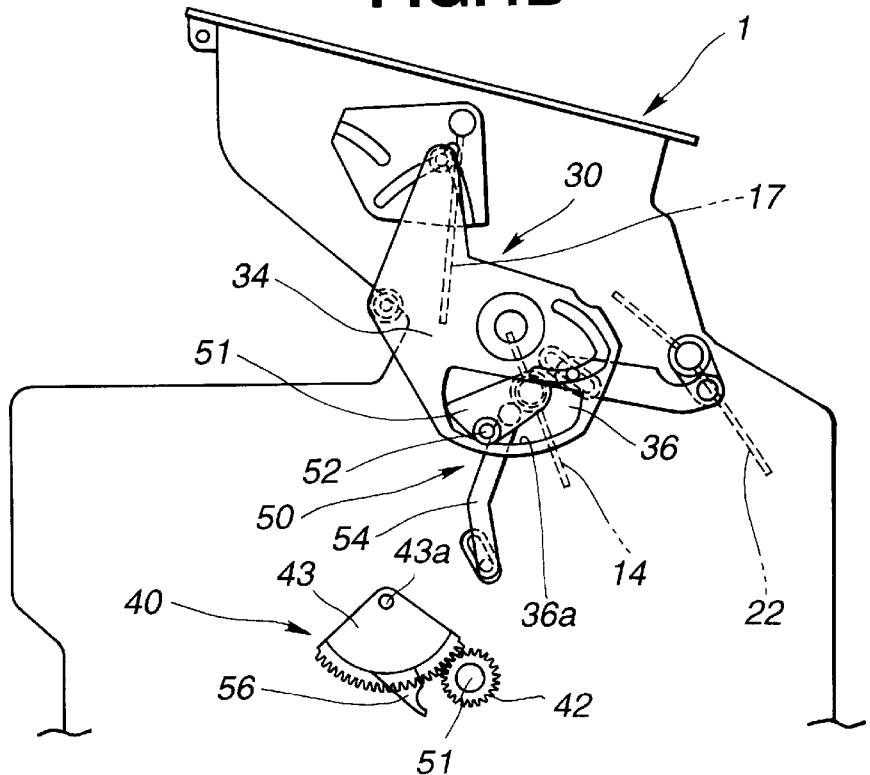
FIG. 4B is a view similar to FIG. 2, but showing a condition wherein the air conditioning device is a bi-level mode of a maximum hot condition.

FIG. 4B shows a condition of the link mechanism wherein the air conditioning device 1 assumes the bi-level mode "B/L" of the maximum hot condition "M/HOT" wherein the air mix door 8 closes the second downstream part 7 of the air flow passage "AFP" while opening the first downstream part 6 of the passage "AFP". In this condition, the engagement between the control lever 54 and the engaging member 56 is cancelled, so that the cam pin 52 of the pivoting lever 51 is put on a raised portion formed on the cam surface 36a of the cam opening 36 of the main lever 34 causing the temperature difference compensating door 14 partially opens the bypass passage 12 by an angle of about 5 degrees. The switch door 17 takes a position to close the defroster opening 16 and open the ventilation opening 15, and the foot door 22 partially opens both the foot passage 21 and the air mix passage 13.

Accordingly, in the bi-level mode "B/L" of the maximum hot condition "M/HOT", the warmed air passing through the first downstream part 6 is allowed to flow in both the bypass passage 12 and the air mix passage 13 and blown into the vehicle cabin from the ventilation opening 15. At the same time, part of the warmed air flowing in the bypass passage 12 is allowed to flow in the foot passage 21 and blown into the lower portion of the vehicle cabin through the foot opening 20.

If, under this condition, for pivoting the air mix door 8 to the intermediate position to partially open both the first and second downstream parts 6 and 7 of the air flow passage "AFP", the sector gear 43 is pivoted upward by an angle of about 45 degrees from the position as shown in FIG. 4B, the switch door 17, the foot door 22 and the temperature difference compensating door 14 are not moved.

Accordingly, in the bi-level mode "B/L" of the half-hot condition "½ HOT" wherein the air mix door 8 halfly opens both the first and second downstream parts 6 and 7 of the air flow passage "AFP", the switch door 17 closes the defroster opening 16 and opens the ventilation opening 15, the foot door 22 partially opens both the air mix passage 13 and the foot passage 21 and the temperature difference compensating door 14 partially opens the bypass passage 12 by an angle of about 5 degrees. Accordingly, under this condition, part of the cooled air directed to the second downstream part 7 is allowed to flow in the bypass passage 12 and directed toward the ventilation opening 15, and remaining part of the cooled air passing through the second downstream part 7 and the warmed air passing through the first downstream part 6 are mixed in the air mix chamber 10 and the air mix passage 13 to provide a temperature-controlled air flow. Part of the temperature-controlled air flow is led into the foot passage 21 from the air mix passage 13 and blown into the power portion of the vehicle cabin through the foot opening 20, and remaining part of the temperature-controlled air flow is directed toward the ventilation opening 15 and cooled by the cooled air passing through the bypass passage 12 before being blown into an upper portion of the vehicle cabin from the ventilation opening 15. That is, temperature-controlled air produced by mixing the cooled air passing through the second downstream part 7 and the warmed air passing through the first downstream part 6 is blown from the foot opening 20 toward the feet of passengers and the temperature-controlled air which has been cooled by the cooled air passing through the bypass passage 12 is blown from the ventilation opening 15 toward upper portions of the passengers.

When, under the bi-level mode "B/L" of the half-hot condition "½HOT", the opening degree of the temperature difference compensating door 14 is changed, the amount of cooled air passing through the bypass passage 12 is varied, which changes the temperature of the temperature-controlled air flow. Accordingly, by appropriately adjusting the opening degree of the temperature difference compensating door 14, the temperature difference between the temperature-controlled air flow blown into the vehicle cabin from the ventilation opening 15 and the temperature-controlled air flow blown into the vehicle cabin from the foot opening 20 can be appropriately adjusted or controlled.

Figure 5A:
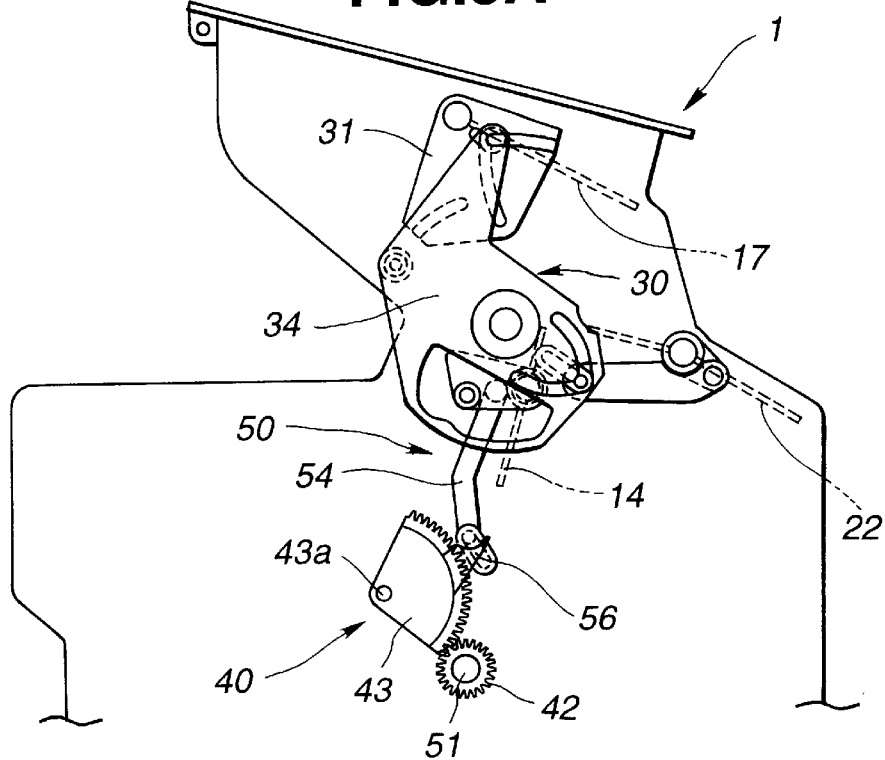
FIG. 5A is a view similar to FIG. 2, but showing a condition wherein the air conditioning device is in a heat mode of a maximum cool condition.

FIG. 5A shows a condition of the link mechanism wherein the air conditioning device 1 assumes the heat mode "HEAT" of the maximum cool condition "M/COOL" wherein the air mix door 8 closes the first downstream part 6 of the air flow passage "AFP" while opening the second downstream part 7 of the passage "AFP". In this condition, the control lever 54 and the engaging member 56 are so engaged as to cause the temperature difference compensating door 14 to fully open the bypass passage 12. The switch door 17 takes a position to close the ventilation opening 15 and open the defroster opening 16, and the foot door 22 takes a position to close the air mix passage 13 and open the foot passage 21.

Accordingly, in the heat mode "HEAT" of the maximum cool condition "M/COOL", part of the cooled air flow passing through the second downstream part 7 of the air flow passage "AFP" is allowed to flow through the bypass passage 12 and blown into the vehicle cabin from the defroster opening 16, and the remaining part of the cooled air flow passing through the second downstream part 7 is allowed to reach the foot passage 21 and blown into the vehicle cabin through the foot opening 20. Under this condition, the temperature difference compensating door 14 exhibits the minimum air flow resistance, and thus maximum amount of cooled air can be blown into the vehicle cabin from the defroster opening 16 and the foot opening 20.

Figure 5B:
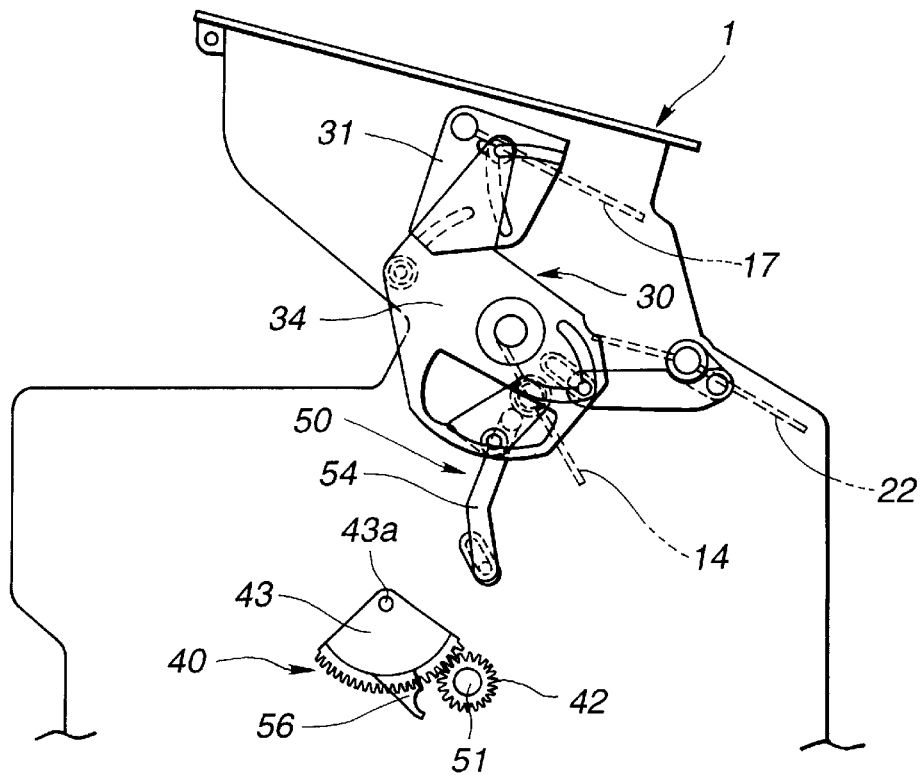
FIG. 5B is a view similar to FIG. 2, but showing a condition wherein the air conditioning device is in a heat mode of a maximum hot condition.

FIG. 5B shows a condition of the link mechanism wherein the air conditioning device 1 assumes the heat mode "HEAT" of the maximum hot condition "M/HOT" wherein the air mix door 8 opens the first downstream part 6 of the air flow passage "AFP" while closing the second downstream part 7 of the passage "AFP". In this condition, the engagement between the control lever 54 and the engaging member 56 is cancelled causing the temperature difference compensating door 14 to close the bypass passage 12. The switch door 17 closes the ventilation opening 15 while opening the defroster opening 16, and the foot door 22 closes the air mix passage 13 while opening the foot passage 21.

Accordingly, in the heat mode "HEAT" of the maximum hot condition "M/HOT", entire amount of the warmed air passing through the first downstream part 6 is allowed to flow through the air mix passage 13 and the foot passage 21 and blown into the vehicle cabin through the foot opening 20.

If, under this condition, for pivoting the air mix door 8 to the intermediate position to partially open both the first and second downstream parts 6 and 7, the sector gear 43 is pivoted upward by an angle of about 45 degrees from the position as shown in FIG. 5B, the switch door 17, the foot door 22 and the temperature difference compensating door 14 are not moved.

Accordingly, in the heat mode "HEAT" of the half-hot condition "½ HOT" wherein the air mix door 8 halfly opens both the first and second downstream parts 6 and 7 of the air flow passage "AFP", the switch door 17 closes the ventilation opening 15 and opens the defroster opening 16, the foot door 22 closes the air mix passage 13 and opens the foot passage 21 and the temperature difference compensating door 14 closes the bypass passage 12. Accordingly, under this condition, the cooled air passing through the second downstream part 7 and the warmed air passing through the first downstream part 6 are all mixed in the air mix chamber 10 and the air mix passage 13 to provide a temperature-controlled air flow. The temperature-controlled air flow is allowed to run through the foot passage 21 to be blown into the vehicle cabin from the foot opening 20.

FIG. 6A shows a condition of the link mechanism wherein the air conditioning device 1 assumes the heat/defrost mode "H/D" of the maximum cool condition "M/COOL" wherein the air mix door 8 closes the first downstream part 6 of the air flow passage "AFP" while opening the second downstream part 7 of the passage "AFP". In this condition, the control lever 54 and the engaging member 56 are so engaged as to cause the temperature difference compensating door 14 to fully open the bypass passage 12. The switch door 17 closes the ventilation opening 15 and opens the defroster opening 16, and the foot door 22 partially opens both the air mix passage 13 and the foot passage 21.

Accordingly, in the heat/defrost mode "H/D" of the maximum cool condition "M/COOL", the cooled air passing through the second downstream part 7 of the air flow passage "AFP" is allowed to flow through the bypass passage 12 and the air mix passage 13 and blown into the vehicle cabin from the defroster opening 16, and at the same time, part of the cooled air passing through the air mix passage 13 is allowed to flow through the foot passage 21 and blown into the vehicle cabin from the foot opening 20. Under this condition, the temperature difference compensating door 14 exhibits the minimum air flow resistance and thus the maximum amount of cooled air can be led into the vehicle cabin from the defroster opening 16 and the foot opening 20.

FIG. 6B shows a condition of the link mechanism wherein the air conditioning device 1 assumes the heat/defroster mode "H/D" of the maximum hot condition "M/HOT" wherein the air mix door 8 opens the first downstream part 6 of the air flow passage "AFP" while closing the second downstream part 7 of the passage "AFP". In this condition, the engagement between the control lever 54 and the engaging member 56 is cancelled, so that the temperature difference compensating door 14 closes the bypass passage 12. The switch door 17 closes the ventilation opening 15 while the defroster opening 16, and the foot door 22 partially opens both the air mix passage 13 and the foot passage 21.

Accordingly, in the heat/defrost mode "H/D" of the maximum hot condition "M/HOT", the warmed air passing through the first downstream part 6 of the air flow passage "AFP" is allowed to flow through the air mix passage 13 and blown into the vehicle cabin from the defroster opening 16, and at the same time, part of the warmed air passing through the air mix passage 13 is allowed to flow through the foot passage 21 and blown into the vehicle cabin from the foot opening 20.

If, under this condition, for pivoting the air mix door 8 to the intermediate position to partially open both the first and second downstream parts 6 and 7, the sector gear 43 is pivoted upward by an angle of about 45 degrees form the position as shown in FIG. 6B, the switch door 17, the foot door 22 and the temperature compensating door 14 are not moved.

Accordingly, in the heat/defrost mode "H/D" of the half-hot condition "½ HOT" wherein the air mix door 8 partially opens both the first and second downstream parts 6 and 7 of the air flow passage "AFP", the switch door 17 closes the ventilation opening 15 while opening the defroster opening 16, the foot door 22 partially opens both the air mix passage 13 and the foot passage 21 and the temperature difference compensating door 14 closes the bypass passage 12. Accordingly, under this condition, the warmed air passing through the first downstream part 6 of the air flow passage "AFP" is allowed to flow through the air mix passage 13 and blown into the vehicle cabin from the defroster opening 16, and at the same time, part of the warmed air passing through the air mix passage 13 is allowed to flow through the foot passage 21 and blown into the vehicle cabin from the foot opening 20.

If, under this condition, for pivoting the air mix door 8 to the intermediate position to partially open both the first and second downstream parts 6 and 7 of the air flow passage "AFP", the sector gear 43 is pivoted upward by an angle of about 45 degrees from the position as shown in FIG. 6B, the switch door 17, the foot door 22 and the temperature difference compensating door 14 are not moved.

Accordingly, in the heat/defrost mode "H/D" of the half-hot condition "½HOT" wherein the air mix door 8 partially opens both the first and second downstream parts 6 and 7 of the air flow passage "AFP", the switch door 17 closes the ventilation opening 15 while opening the defroster opening 16, the foot door 22 partially opens both the air mix passage 13 and the foot passage 21 and the temperature difference compensating door 14 closes the bypass passage 12. Accordingly, under this condition, the cooled air passing through the second downstream part 7 of the air flow passage "AFP" and the warmed air passing through the first downstream part 6 of the passage "AFP" are all mixed in the air mix chamber 10 and the air mix passage 13 to provide a temperature-controlled air flow. Part of the temperature-controlled air flow is allowed to flow through the air mix passage 13 and blown into the vehicle cabin from the defroster opening 16, and at the same time, remaining part of the temperature-controlled air flow is allowed to flow through the foot passage 21 and blown into the vehicle cabin from the foot opening 20.

Figure 7A:
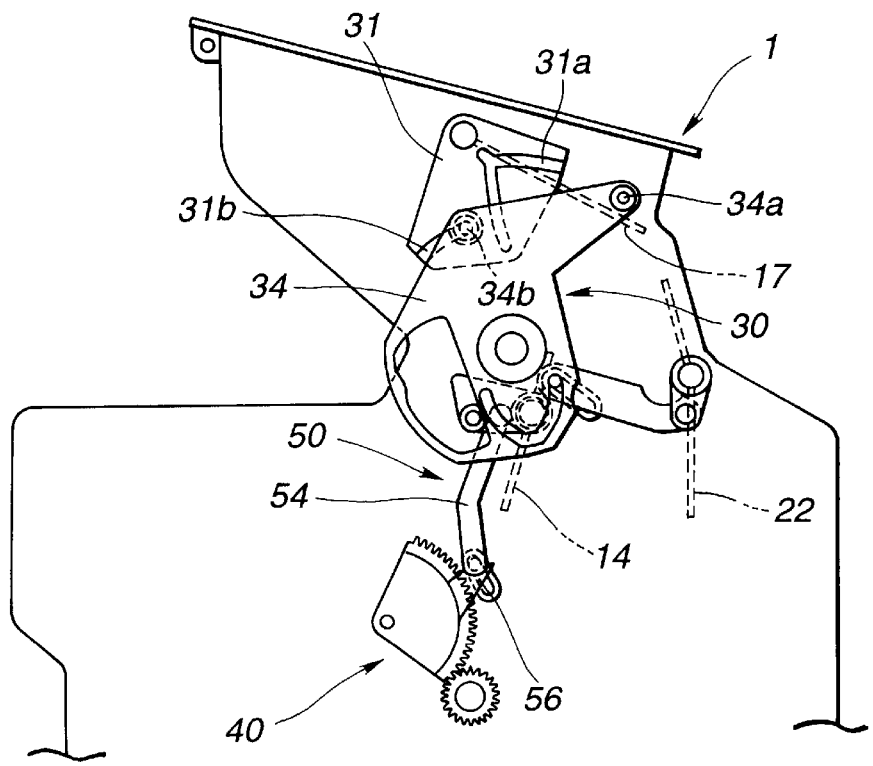
FIG. 7A is a view similar to FIG. 2, but showing a condition wherein the air conditioning device is in a defrost mode of a maximum cool condition.

FIG. 7A shows a condition of the link mechanism wherein the air conditioning device 1 assumes the defrost mode "DEF" of the maximum cool condition "M/COOL" wherein the air mix door 8 closes the first downstream part 6 of the air flow passage "AFP" while opening the second downstream part 7 of the passage "AFP". In this condition, the control lever 54 and the engaging member 56 are so engaged as to cause the temperature difference compensating door 14 to fully open the bypass passage 12, and the engagement between the first engaging groove 31a of the pivoting lever 31 and the first engaging pin 34a of the main lever 34 is cancelled and engagement between the second engaging groove 31b of the pivoting lever 31 and the second engaging pin 34b of the main lever 34 is established, so that the switch door 17 closes the ventilation opening 15 while opening the defroster opening 16. The foot door 22 closes the foot passage 21 while opening the air mix passage 13. Accordingly, under this condition, the cooled air passing through the second downstream part 7 of the air flow passage "AFP" is allowed to flow through the bypass passage 12 and the air mix passage 13 and blown into the vehicle cabin from the defroster opening 16. Under this condition, the temperature difference compensating door 14 exhibits the minimum air flow resistance, and thus the maximum amount of cooled air can be led into the vehicle cabin from the defroster opening 16.

Figure 7B:
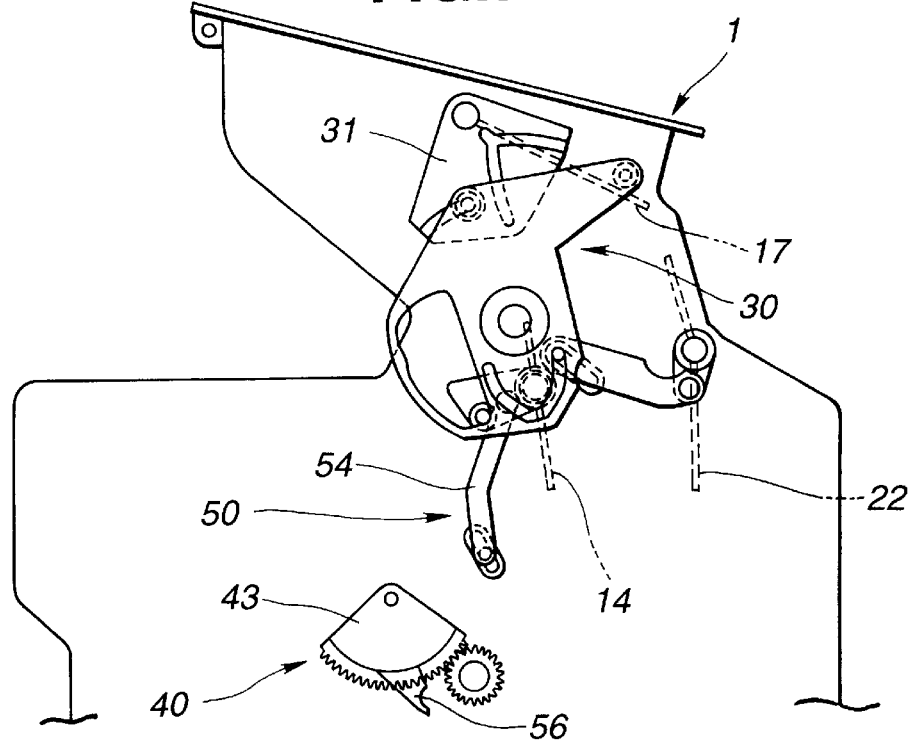
FIG. 7B is a view similar to FIG. 2, but showing a condition wherein the air conditioning device is a defrost mode of a maximum hot condition.

FIG. 7B shows a condition of the link mechanism wherein the air conditioning device 1 assumes the defrost mode "DEF" of the maximum hot condition "M/HOT" wherein the air mix door 8 opens the first downstream part 6 of the air flow passage "AFP" while closing the second downstream part 7 of the passage "AFP". In this condition, the engagement between the control lever 54 and the engaging member 56 is cancelled and the cam pin 52 of the pivoting lever 51 is pressed against the cam surface 35a of the cam opening 36 of the main lever 34 causing the temperature difference compensating door 14 to partially open the bypass passage 12 by an angle of about 20 degrees. The switch door 17 closes the ventilation opening 15 while opening the defroster opening 16, and the foot door 22 closes the foot passage 21 while opening the air mix passage 13.

Accordingly, in the defrost mode "DEF" of the maximum hot condition "M/HOT", the warmed air passing through the first downstream part 6 of the air flow passage "AFP" is allowed to flow through the bypass passage 12 and the air mix passage 13 and blown into the vehicle cabin from the defroster opening 16.

If, under this condition, for pivoting the air mix door 8 to the intermediate position to partially open both the first and second downstream parts 6 and 7, the sector gear 43 is pivoted upward by an angle of about 45 degrees from the position as shown in FIG. 7B, the switch door 17, the foot door 22 and the temperature difference compensating door 14 are not moved.

Accordingly, in the defrost mode "DEF" of the half-hot condition "½HOT" wherein the air mix door 8 partially opens both the first and second downstream parts 6 and 7 of the air flow passage "AFP", the switch door 17 closes the ventilation opening 15 while opening the defroster opening 16, the foot door 22 closes the foot passage 21 while opening the air mix passage 13 and the temperature difference compensating door 14 partially opens the bypass passage 12 by an angle of about 20 degrees.

Accordingly, in the defrost mode "DEF" of the half-hot condition "½HOT", part of the cooled air passing through the second downstream part 7 of the air flow passage "AFP" is allowed to pass through the bypass passage 12 and reach to the defroster opening 16, and the remaining part of the cooled air is led into the air mix chamber 10 and the air mix passage 13 to be mixed with the warmed air flowing from the first downstream passage 6. The mixed and thus temperature-controlled air is allowed to flow from the air mix passage 13 to the defroster opening 16 and mixed with and cooled by the cooled air coming from the bypass passage 12 and blown into the vehicle cabin from the defroster opening 16.

It is to be noted that in the defrost mode "DEF" of the maximum cool condition "M/COOL", the temperature difference compensating door 14 fully opens the bypass passage 12, while in the defrost mode "DEF" of the maximum hot condition "M/HOT" or the half-hot condition "½HOT", the temperature difference compensating door 14 partially opens the bypass passage 12 by an angle of about 20 degrees. In the defrost mode "DEF" of every conditions, the air flow resistance exhibited by the temperature difference compensating door 14 is small, so that the amount of air blown onto the window of the vehicle is increased thereby effectively defrosting the window.

As has been described hereinabove, in the maximum cool condition "M/COOL" wherein the air mix door 8 closes the first downstream part 6 of the air flow passage "AFP" while opening the second downstream part 7 of the passage "AFP", the bypass passage 12 is fully opened by the temperature difference compensating door 14 irrespective of the mode assumed by the air conditioning device 1. That is, in the maximum cool condition "M/COOL", the temperature difference compensating door 14 exhibits the minimum air flow resistance, so that the maximum amount of cooled air can be fed to the vehicle cabin throughout all modes.

Thus, like in the above-mentioned conventional air conditioning device, when assuming the ventilation mode "VENT" of the maximum cool condition "M/COOL" in hot season, the air conditioning device 1 of the invention can quickly reduce the temperature in the vehicle cabin.

While, in the ventilation mode "VENT" of the half-hot condition "½HOT" wherein the air mix door 8 partially opens both the first and second downstream parts 6 and 7 of the air flow passage "AFP", the bypass passage 12 is closed by the temperature difference compensating door 14. Accordingly, in such mode, the cooled air passing through the second downstream part 7 and the warmed air passing through the first downstream part 6 are all mixed in the air mix chamber 10 to provide a temperature-controlled air flow. This air flow is led into the vehicle cabin from the ventilation opening 15. Accordingly, as compared with the above-mentioned conventional air conditioning device "B", much effective air mixing is obtained.

In the bi-level mode "B/L" of the half-hot condition "½HOT", the bypass passage 12 is partially opened by the temperature difference compensating door 14. In such mode, part of the cooled air passing through the second downstream part 7 is directed toward the ventilation opening 15 through the bypass passage 12, and the remaining part of the cooled air is directed to the air mix chamber 10 and the air mix passage 13 to be mixed with the warmed air coming from the first downstream part 6. The mixed air thus provides a temperature-controlled air flow. Part of the temperature-controlled air is blown toward the feet of the passengers from the foot opening 20, and the remaining part of the temperature-controlled air is mixed and thus cooled by the cooled air from the bypass passage 12 and then blown toward upper portions of the passengers from the ventilation opening 15. Thus, in such mode, the passengers can enjoy an appropriate air conditioning wherein their heads are suitably cooled and their feet are suitable warmed.

If, in the bi-level mode "B/L" of the half-hot condition "½HOT", the opening degree of the temperature difference compensating door 14 is finely adjusted, much comfortable air conditioning can be enjoyed by the passengers.

When, by operating the second link mechanism section 40, the air mix door 8 is pivoted to the so-called "cooled air feeding position" to close the first downstream part 6 of the air flow passage "AFP" and open the second downstream part 7 of the passage "AFP", the second link mechanism 40 is brought into engagement with the third link mechanism section 50 and the engagement between the first link mechanism section 30 and the third link mechanism section 50 is cancelled. Upon this, the temperature difference compensating door 14 is slidably moved by the second link mechanism section 40 through the third link mechanism section 50.

When the air mix door 8 is pivoted, by the second link mechanism section 40, to a position other than the above-mentioned cooled air feeding position, the engagement between the second link mechanism section 40 and the third link mechanism section 50 becomes cancelled and the first link mechanism section 30 and the third link mechanism section 50 become engaged. Upon this, the temperature difference compensating door 14 is moved by the first link mechanism section 30 through the third link mechanism section 50. When pivoted, the first link mechanism section 30 can actuate the switch door 17 and the foot door 22 at the same time.

That is, in the air conditioning device 1 of the invention, all of the switch door 17, the foot door 22, the air mix door 8 and the temperature difference compensating door 14 can be controlled by only moving the first link mechanism section 30 and the second link mechanism section 40. That is, control of all the doors is carried out with ease.

When, in the air conditioning device 1 of the invention, the air mix door 8 is slid downward toward the above-mentioned cooled air feeding position, the engaging member 56 secured to the sector gear 43 pushes up the control lever 54 against the force of the spring 53. That is, in the invention, the weight of the air mix door 8 works to help the engaging member 56 in lifting up the control lever 54. This arrangement is very advantageous when the switch door 17, the foot door 22, the air mix door 8 and the temperature difference compensating door 14 are manually operated. Due to the same reason, a powerful spring can be used as the spring 53. Thus, when the temperature difference compensating door 14 takes the position to close the bypass passage 12, assured sealing is obtained by the door 14.

What is claimed is:

1. An automotive air conditioning device comprising:

an air flow passage including an upstream part and first and second downstream parts each extending downstream from a downstream end of said upstream part;

an evaporator installed in said upstream part to cool air flowing therethrough;

a heater core installed in said first downstream part to heat air flowing therethrough;

a slide type air mix door which slides between a first slide position where the door closes the first downstream part while opening the second downstream part and a second slide position where the door opens the first downstream part while closing the second downstream part;

an air mix chamber with which downstream portions of said first and second downstream parts are merged;

a partition wall extending in and along said air mix chamber to define at a downstream portion of said air mix chamber a bypass passage and an air mix passage, said bypass passage having an upstream portion facing said second downstream part, said air mix passage having an upstream portion facing both said first and second downstream parts;

a temperature difference compensating door pivotally installed in said bypass passage to open and close the bypass passage;

ventilation and defroster openings each facing downstream portions of said bypass passage and said air mix passage;

a pivotal switch door which pivots between a first angular position where the door closes the defroster opening while opening the ventilation opening and a second angular position where the door opens the defroster opening while closing the ventilation opening;

a foot opening facing said air mix passage;

a pivotal foot door for opening and closing said foot opening; and a link mechanism for synchronously actuating said air mix door, said temperature difference compensating door, said switch door and said foot door, wherein said link mechanism is so constructed that when said air mix door assumes said first slide position, said temperature difference compensating door fully opens said bypass passage irrespective of the mode taken by the air conditioning device, and when said air mix door takes an intermediate position to partially open both the first and second downstream parts or takes said second slide position, said temperature difference compensating door takes one of predetermined three angular positions in accordance with the mode taken by the air conditioning device.

2. An automotive air conditioning device as claimed in claim 1, in which said predetermined three angular positions are:

a first angular position to fully close said bypass passage;

a second angular position to partially open said bypass passage by an angle of about 5 degrees; and a third angular position to partially open said bypass passage by an angle of about 20 degrees.

3. An automotive air conditioning device as claimed in claim 2, in which:

said first angular position of said temperature difference compensating door is taken when one of ventilation, heat and heat/defrost modes is taken by the air conditioning device;

said second angular position of said temperature difference compensating door is taken when a bi-level mode is taken by the air conditioning device; and said third angular position of said temperature difference compensating door is taken when a defrost mode is taken by the air conditioning device.

4. An automotive air conditioning device as claimed in claim 1, in which said link mechanism comprises:

a first link mechanism section which controls said switch door and said foot door;

a second link mechanism section which controls said air mix door; and a third link mechanism section which controls said temperature difference compensating door in response to movements of said first and second link mechanism sections.

5. An automotive air conditioning device as claimed in claim 4, in which said first link mechanism section comprises:

a switch door pivoting lever which is integrally pivotal with said switch door;

a foot door pivoting lever which is integrally pivotal with said foot door; and a main lever which is detachably engageable with said switch door pivoting lever; and a connecting lever through which said main lever is operatively connected to said foot door pivoting lever.

6. An automotive air conditioning device as claimed in claim 5, in which said main lever has a center portion pivotally connected to a case, and in which said main lever has at one end thereof a first engaging pin slidably engaged with a first engaging groove formed in said switch door pivoting lever, and at another end thereof a second engaging pin detachably engageable with a second engaging groove formed in said switch door pivoting lever.

7. An automotive air conditioning device as claimed in claim 6, in which said first link mechanism section further comprises:

an engaging slot formed in said main lever;

a cam opening formed in said main lever;

a pin provided by said connecting lever and slidably engaged with said engaging slot; and an elongate slot formed in a guide member provided on said case, said elongate slot having said pin slidably engaged therewith.

8. An automotive air conditioning device as claimed in claim 7, in which said second link mechanism section comprises:

sliding means for sliding said slide type air mix door between said first and second slide position when actuated;

a driving shaft for actuating said sliding means when rotated;

a driving gear disposed on said driving shaft; and a sector gear meshed with said driving gear.

9. An automotive air conditioning device as claimed in claim 8, in which said third link mechanism section comprises:

a pivoting lever which is integrally pivotal with said temperature difference compensating door;

a cam pin fixed to said pivoting lever;

a spring for biasing said cam pin in a certain direction;

a control lever having one end pivotally connected to said pivoting lever;

a movement restricting member which restricts a movement of the other end of said control lever; and an engaging member provided by said sector gear of said second link mechanism section, said engaging member being detachably engageable with the other end of said control lever.

10. An automotive air conditioning device as claimed in claim 9, in which said movement restricting member is fixed to said case and formed with an elongate slot with which a pin provided by the other end of said control lever is slidably engaged.

* * * * *